Oct. 19, 1965     H. G. ROBERTSON     3,212,458
ADJUSTABLE LOAD SPACER
Filed July 5, 1962     4 Sheets-Sheet 1

INVENTOR.
HARRY G. ROBERTSON
BY Threedy & Threedy
HIS ATTORNEYS.

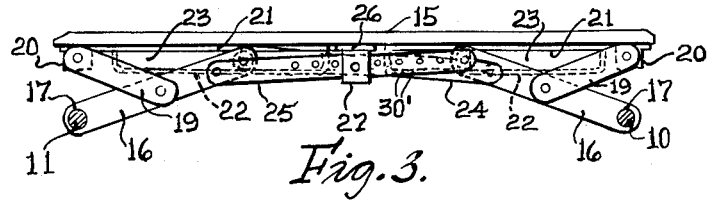
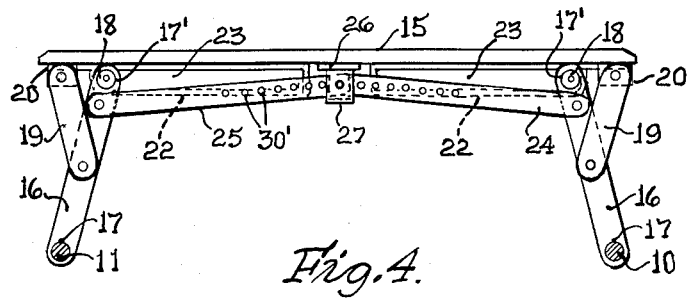
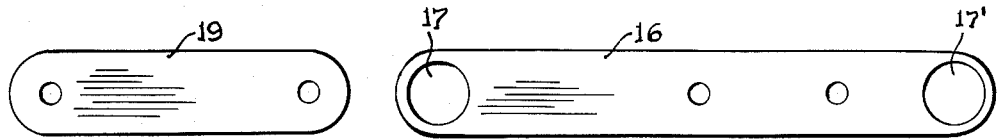
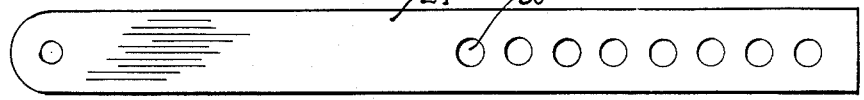
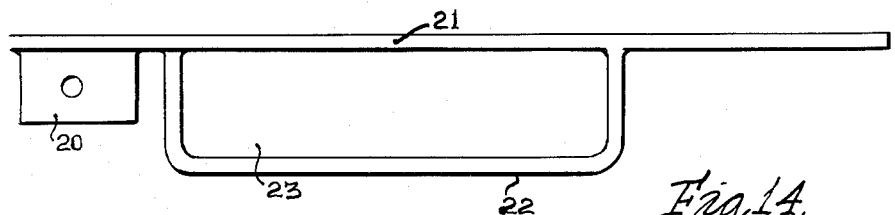
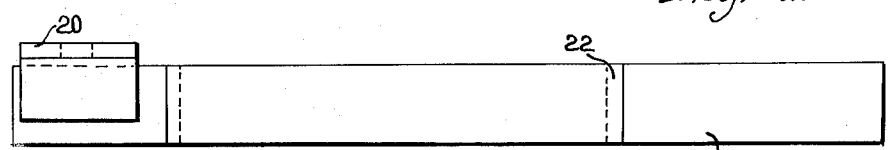

Oct. 19, 1965   H. G. ROBERTSON   3,212,458
ADJUSTABLE LOAD SPACER
Filed July 5, 1962   4 Sheets-Sheet 3

INVENTOR.
HARRY G. ROBERTSON
BY Shreedy & Shreedy
HIS ATTORNEYS.

Oct. 19, 1965     H. G. ROBERTSON     3,212,458
ADJUSTABLE LOAD SPACER
Filed July 5, 1962     4 Sheets-Sheet 4

INVENTOR.
HARRY G. ROBERTSON
BY Shreedy & Shreedy
HIS ATTORNEYS.

United States Patent Office 3,212,458
Patented Oct. 19, 1965

3,212,458
ADJUSTABLE LOAD SPACER
Harry G. Robertson, Blue Island, Ill., assignor, by mesne assignments, to Transco, Inc., Chicago, Ill., a corporation of Delaware
Filed July 5, 1962, Ser. No. 207,703
5 Claims. (Cl. 105—369)

My invention relates to a new and useful improvement in an Adjustable Load Spacer and, more particularly, to a device for reducing the inside width of a standard freight hauling vehicle.

A principal object of my invention is in the provision in a device of this character of a means for movably supporting a verically extending side wall panel within a freight hauling vehicle.

Another object of my invention is in the provision in an apparatus of this character of a releasable latch mechanism for locking the adjustable load spacer in any desired position to effectively reduce the inside width of a freight hauling vehicle.

A further object of my invention is in the provision in an apparatus of this character of a pivoting link-toggle arrangement for movably supporting an adjustable wall panel relative to the side walls of a freight hauling vehicle.

Yet another object of this invention is in the provision of an apparatus of this character of an arrangement of parts which comprise a plurality of flush horizontally aligned wall panels adapted to be individually adjusted to vary the interior area of a freight hauling vehicle.

Other objects will appear hereinafter.

The invention consists in the novel method to be hereinafter described and claimed.

The invention will be best understood by reference to the accompanying drawing in which:

FIG. 3 is a plan view of the linkage connection associated with the adjustable load spacer, showing the relation of parts when said load spacer is in its retracted position.

FIG. 4 is a view similar to FIG. 3 and showing the linkage and load spacer in its protracted or extended position.

FIGS. 5, 6, 7 and 8, each separately show an element of the linkage used in the construction as illustrated in FIGS. 3 and 4.

Figures 9, 10:
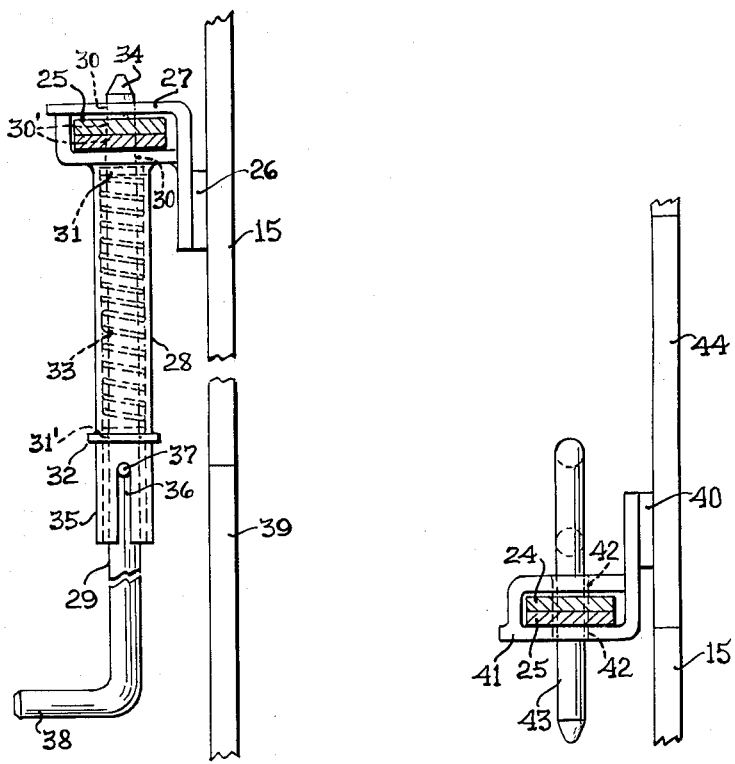

FIG. 9 is a fragmentary side elevational view of the top locking mechanism associated with my invention.

FIG. 10 is a fragmentary side elevational view of the bottom locking mechanism associated with my invention.

Figure 11:
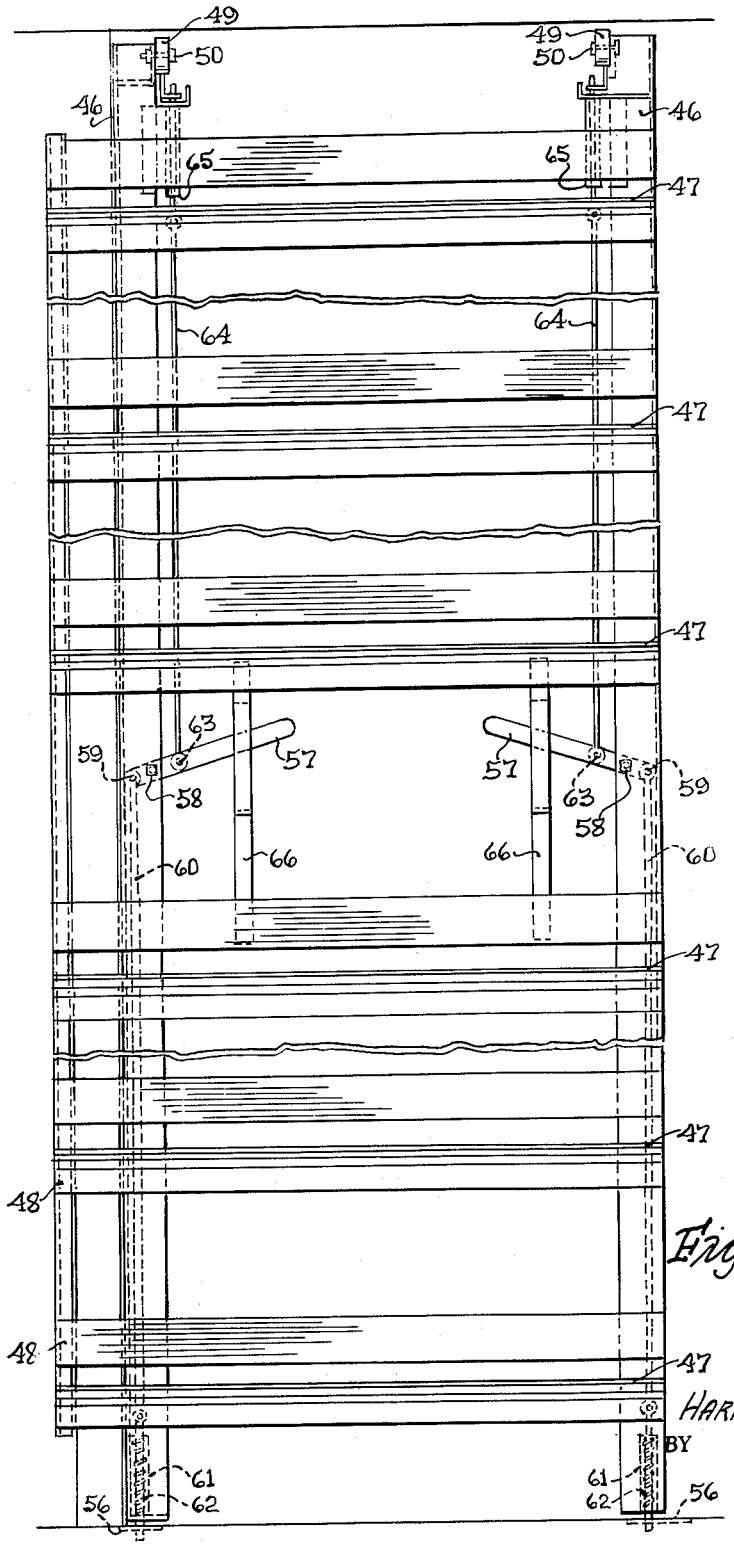

FIG. 11 is a front elevational view of a modified form of the adjustable load spacer wherein the face panel is replaced with a plurality of vertically aligned horizontally extending belt and rub rails.

Figure 12:
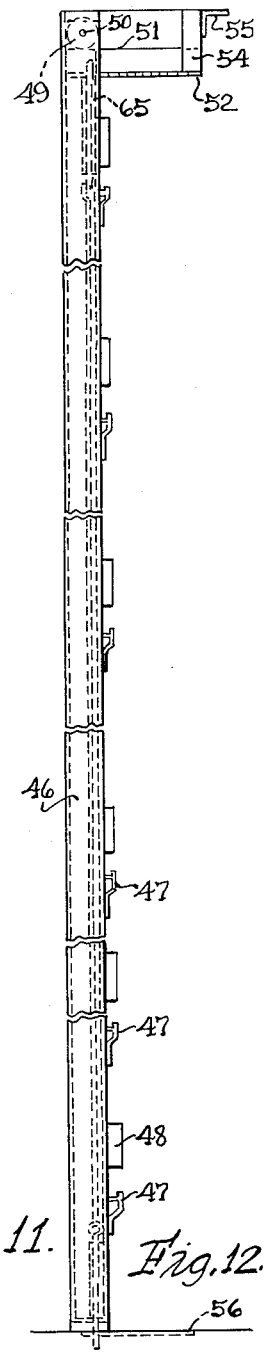

FIG. 12 is a fragmentary side elevational view of the modified load spacer as shown in FIG. 11.

Figure 13:
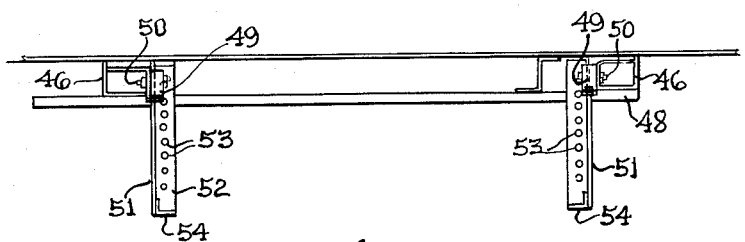

FIG. 13 is a fragmentary top plan view of the supporting track member associated with the adjustable load spacer as illustrated in FIGS. 11 and 12.

Figure 1:
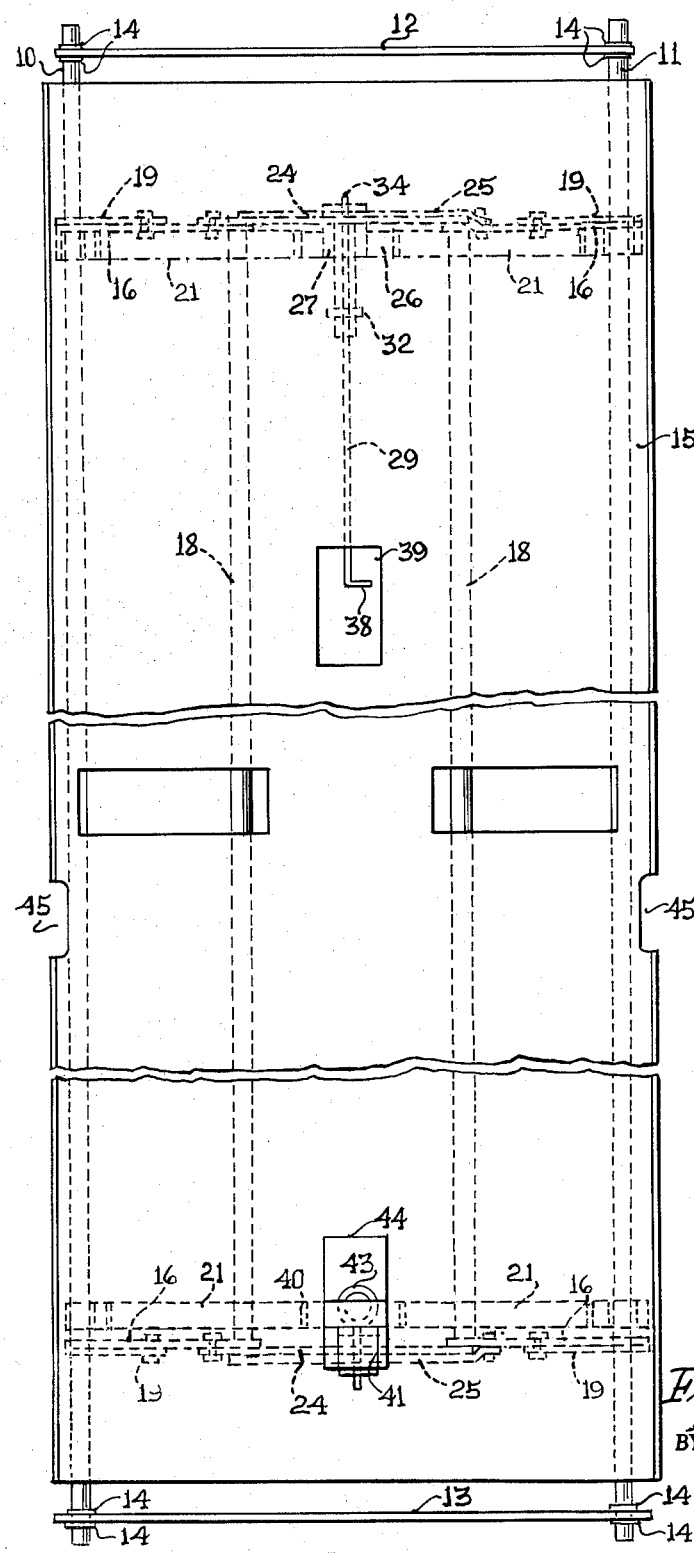
FIG. 1 is a front elevational view of one of the adjustable load spacers showing in dotted lines its frame support structure and locking mechanism.
Figure 2:
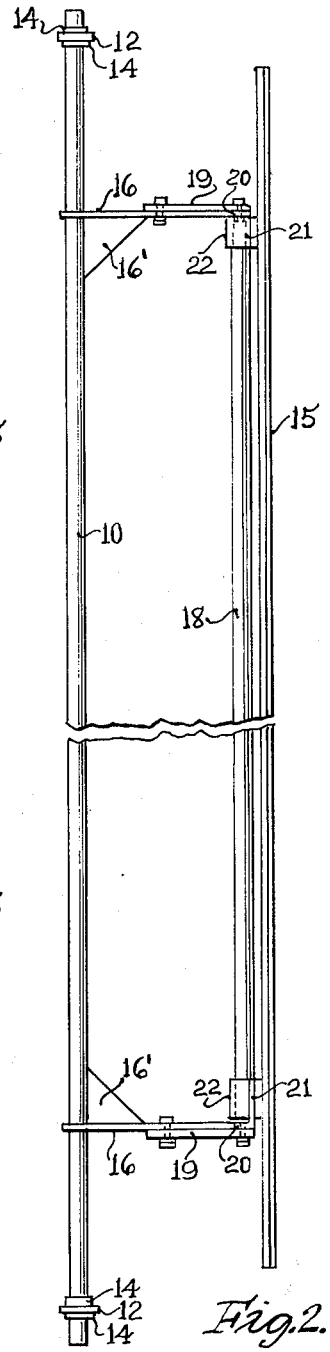
FIG. 2 is a side elevational view of one of my adjustable load spacer in an extended position.

FIGS. 14 and 15 are fragmentaray plan views of guide bars as used in association with the linkage connection for the adjustable load spacer as shown in FIGS. 1 and 2.

The adjustable load spacer of my invention is adapted to be positioned in a vertical relation with respect to the side or end walls of a freight hauling vehicle or a freight storage compartment and is adapted to be horizontally aligned with respect to like load spacers. The preferred form of construction of my adjustable load spacers comprises a frame structure including a pair of vertically extending elongated tubular members 10 and 11. These tubular members 10 and 11 are adapted to be pivotally connected to the floor and ceiling of the freight hauling vehicle or freight storage compartment in a parallel plane with respect to the side or end walls thereof. Adjacent the upper and lower ends of the tubular members 10 and 11 and connecting the same together in spaced relation are framing bars 12 and 13. The tubular members 10 and 11 are adapted to be projected through circular openings formed in the framing bars 12 and 13, the diameters of which are slightly greater than the diameters of the tubular members 10 and 11 so that such members are adapted to be freely rotated about their long axis relative to the framing bars 12 and 13. The framing bars 12 and 13 are freely positioned between washers 14 welded to the tubular members 10 and 11 on eitiher sides of the bars 12 and 13 as seen in FIGS. 1 and 2.

A load engaging panel 15 is adapted to be adjustably connected to the frame structure just described. To connect the panel 15 to the frame structure for horizontal adjustment relative thereto, I provide a plurality of toggle-like extension means. Each of the extension means comprises a combination of links adjustably connected together. As seen in FIGS. 3 and 4 there is provided a combination of toggle links adjacent each corner of the panel 15 for adjustably connecting the same to the frame structure. The toggle-link combination comprises a long link 16 one end of which has an aperture 17 formed therein, which is adapted to receive the tubular member with which it is associated. As viewed in FIGS. 3 and 4 there are two long links 16 associated with each of the tubular members 10 and 11. In such figures, it is seen that the tubular members 10 and 11 are projected through the apertures 17 formed in each of the long links 16. To fixedly connect the long links 16 to their respective tubular members 10 and 11, I provide a gusset 16' that is adapted to be welded to the long link 16 and the associated tubular member 10 and 11 as seen in FIG. 2. The other end of each of the long links 16 has a like aperture 17' formed therein and which are adapted to pivotally receive supporting members 18. These supporting members 18 are of a length less than the panel 15 as viewed in FIGS. 1 and 2 and are adapted to support the weight of the panel 15 and cooperate with the toggle-like extension means for adjustably positioning the panel 15 relative to the fixed pivotal tubular members 10 and 11.

Connected to each of the long links 16 intermediate the ends thereof is one end of a short link 19. The opposite end of each of these short links 19 is pivotally connected to a horizontally extending end flange 20 provided by a pair of longitudinally extending guide bars 21 fixedly connected to the back of the load engaging panel 15. These guide bars 21 are provided on their exposed faces with a U-shaped member 22 that provides a horizontally disposed vertically extending guideway 23 for each of the supporting members 18 as viewed in FIGS. 3 and 4.

Connected to the long link 16, fixedly carried by the tubular member 10, and adjacent one end thereof is an elongated latch bar 24. Connected in a like manner to the corresponding long link 16, fixedly connectd to the tubular member 11, is a corresponding latch bar 25 of the construction shown in FIG. 8. This latch bar 25 is provided with an offset portion 26 so that the latch bars may lie in flat facial relation substantially throughout their length as they extend in a superimposed horizontal plane from their connections to their respective long links 16, as seen in FIG. 1, 3 and 4.

From the foregoing description and by reference to FIGS. 3 and 4, it is clearly apparent that I have provided an adjustable extension means for the load spacer panel 15.

It is an object of my invention to be able to latch the load spacer panel 15 in varying spaced relation with respect to the side walls of the freight hauling vehicle or freight storage compartment. To accomplish this object, I provide a latching means hereinafter described. Referring to FIG. 9, I disclose the preferred form of the top latching mechanism to be associated with the adjustable load spacer. In this regard, I provide a mounting support 26 in the form of a flat bar which is adapted to be connected to the back of the panel 15 between the opposite ends of the guide bars 21. This support 26 carries a hollow rectangularly shaped bracket 27 through which the super-imposed free ends of the latch bars 24 and 25 project. Extending downwardly from the bracket 27 is a latch casing 28. Slidably projected into the latch casing 28 is a movable latch pin 29. The free end of the latch pin 29 normally projects through apertures 30 formed in the bracket 27 and through selected apertures 30' formed in each of the latch bars 24 and 25. Fixedly mounted on the latch pin 29 within the casing 28 is a head washer 31. The casing 28 is provided at its free end with a like washer 32 having an aperture 31' of a size equal to the latch pin 29 but less than the inside diameter of the casing 28 so as to provide a restricted passage therethrough. Within the casing 28, between the head washer 31 and the end washer 32 is a coil spring 33 encircling the latch pin 29. By this arrangement, the coil spring 33 normally urges the latch pin 29 longitudinally through the casing 28 into a latching position wherein the free end 34 of such latch pin 29 will project through the apertures 30 formed in the bracket 27 and apertures 30' formed in the latch bars 24 and 25 as seen in FIG. 1.

Connected to the end washer 32 and extending therefrom in axial alignment with the casing 28 is a latch housing 35. An open slot 36 is formed in the wall of the latch housing 35 as seen in FIG. 9. The latch pin 29 is provided with a laterally projecting stud 37 which is adapted to move into and out of the open slot 36 as the latch pin 29 is moved longitudinally through the casing 28. By this arrangement, the latch pin 29 may be moved relative to the casing 28 so that the free end 34 thereof is retracted out of the apertures formed in the housing 27 and latch bars 24 and 25 so that said latch bars may be moved through the housing 27. When the latch pin 29 is so moved relative to the casing 28 and when the stud 37 is out of the slot 36, the latch pin 29 may be rotated about its long axis so that the stud 37 will engage the free end of the latch housing 35 and hold the latch pin 29 out of latching position. The free end of the latch pin 29 may be bent laterally to form a handle 38 which may be accessible from the front of the panel 15 through an elongated opening 39 formed therein as seen in FIG. 1. As the panel 15 is of a substantial length, it is desirable to include a latch mechanism adjacent the bottom thereof. Referring to FIG. 10, I show a bottom latch mechanism which includes a mounting support 40 in the form of an elongated flat bar which is adapted to be connected to the back of the panel 15 between the ends of the guide bars 21 as seen in FIG. 1. This support 40 carries a rectangularly shaped housing 41 through which the latch bars 24 and 25 project. Formed in the top and bottom wall of the housing 41 in vertical alignment are apertures 42. These apertures 42 are adapted to be aligned with the apertures 30' formed in the bars 24 and 25 when the same project through the housing 41. A removable latch bolt 43 is adapted to be projected through the apertures 42 and 30' so as to latch the latch bars 24 and 25 in any desired adjusted position. The panel 15 is provided with an opening 44 through which the latch bolt 43 is accessible.

From the foregoing, I have provided an adjustable load spacer which may be adjustably positioned with respect to an associated wall. Through the toggle-like extension means the load engaging panel 15 may be moved to a horizontal plane from a retracted position as seen in FIG. 1 and 3 into a protracted position indicated in FIGS. 2 and 4. When the latch pin 29 and latch bolt 43 are in an unlatched position with respect to the latch bars 24 and 25, the panel 15 may be gripped at its longitudinal edges at hand-grip openings 45 and pulled away from the stationary tubular members 10 and 11.

The latch bars 24 and 25 will slide through the rectangularly shaped housings 27 and 41 in opposite directions with respect to each other as the long links 16 are caused to move through opposite paths as the tubular members 10 and 11 are pivoted about their long axis. The supporting members 18 will move in the guideways 23 provided by the guide bars 21 until they reach the opposite outermost ends of the guideways 23 as seen in FIG. 4. The pivoting of the tubular members 10 and 11 is brought about by the pulling motion exerted upon the long links 16 by the short links 19 which are connected to the panel 15. The panel 15 may be latched in any position between the extreme positions shown in FIGS. 3 and 4 by simply inserting the latch pin 29 and latch bolt 43 in any of the selected aligned apertures 30' formed in the latch bars 24 and 25.

Referring to FIGS. 11 through 13, I disclose a modified adjustable load spacer which comprises two vertically extending spaced apart rectangularly shaped posts 46. Connected to these vertically extending posts and extending in a horizontal direction are a plurality of belt rails 47 and rub rails 48.

Each of the rectangularly shaped posts 46 is provided adjacent its upper end with a supporting roller 49 journaled upon a fixed stud shaft 50. These rollers 49 are adapted to rollably engage edge portions of L-shaped track members 51. The track members 51 each provide a horizontally extending flange portion 52 extending beneath the rollers 49 and which are provided throughout their longitudinal length with a series of latching holes 53 adapted to receive latching pins hereinafter described.

One end of each of the track members 51 is fixedly attached to the side wall of the freight car in any manner such as by welding or the like. The opposite end of the track members 51 are supported by a depending angle iron 54 which is adapted to be welded to a roof structural member 55 provided by the freight hauling vehicle for freight storage compartment.

Inserted in the floor of the freight hauling vehicle or freight storage compartment in vertical alignment with each of the track members 51 is a latch plate 56. These latch plates 56 are provided with a plurality of latch openings corresponding to and in vertical alignment with the latch holes 53 formed in the track members 51.

Each of the posts 46 is provided with a latch lever 57 which is pivotally connected as at 58 to the posts 46 as seen in FIG. 11. Pivotally connected as at 59 to one end of each of the latch levers 57 is a depending latch pin 60. These latch pins 60 adjacent the lower end of the posts 46 extend through a housing 61 carried by the posts 46 and have their free ends projectable into the latch openings formed in the latch plate 56 as viewed in FIGS. 11 and 12. The housings 61 each enclose a spring 62 which is coiled about the latch pins 60 and normally urge the same into an unlatched position. Pivotally connected as at 63 to each of the latch levers 57, and on opposite sides of the pivotal connection 58 between the latch levers 57 and posts 46 are upwardly projecting latch pins 64. These latch pins 64 are adapted to project through housing 65 carried by each of the posts 46 adjacent the upper ends thereof as viewed in FIGS. 11 and 12. The free ends of the upper projecting latch pins 64 are adapted to be projected into the latch holes 53 formed in the flange portion 52 of the track members 51.

The latch levers 57 are projected through guide bars 66 as viewed in FIG. 11.

From the foregoing description it is apparent that when the latch levers 57 are pivoted into the position shown in FIG. 11, the upper and lower projecting latch pins 60 and 64 will be projected in opposite directions into latching engagement with the track members 51 and latch plates 56. When the handles 57 are pivoted about their pivotal connection 58 in an opposite direction, the latch pins 60 and 64 will be withdrawn from latching engagement with the track members 51 and latch plates 56 respectively and the load spacer may then be moved over the track members 51 into any desired position relative to the side wall.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to protect by Letters Patent is:

1. An adjustable load spacer for freight receiving chambers defined in part by a floor and side walls comprising,
  (a) a freight engaging panel having a normal vertically disposed position with respect to the floor, and a horizontally aligned position with respect to the side walls of the freight receiving chamber,
  (b) a marginal frame for said panel including a pair of tubular members rotatable about their long axes and extending in a fixed vertical plane in the freight receiving chamber in spaced parallel relation to the side walls thereof,
  (c) means connecting said panel to said tubular members for horizontal movement relative to the side walls of the freight receiving chamber,
  (d) said means comprising a plurality of toggle links extendable through a horizontal plane for adjustably moving said panel in its vertical plane horizontally with respect to the side walls,
  (e) certain of said toggle links having an end fixedly connected to and rotatable with said tubular members and pivotally connected adjacent their opposite ends to another set of toggle links,
  (f) said another set of toggle links having their free ends pivotally connected to said panel whereby rotatable movement of said tubular members about their long axes will pivot said certain of said toggle links and said another set of toggle links relative to each other and said panel to move the same horizontally with respect to the side walls, and
  (g) latch means carried by the free end of said certain of said toggle links for releasably latching said plurality of toggle links against extendable movement relative to each other and to prevent rotation of said tubular members about their long axes.

2. An adjustable load spacer for freight receiving chambers defined in part by a floor and side walls comprising,
  (a) a freight engaging panel having a normal vertically disposed position with respect to the floor, and a horizontally aligned position with respect to the side walls of the freight receiving chamber,
  (b) a marginal frame of said panel including a pair of tubular members rotatable about their long axes and extending in a fixed vertical plane in the freight receiving chamber in spaced parallel relation to the side walls thereof,
  (c) means connecting said panel to said tubular members for horizontal movement relative to the side walls of the freight receiving chamber,
  (d) said means comprising a plurality of toggle links extendable through a horizontal plane for adjustably moving said panel in its vertical plane horizontally with respect to the side walls,
  (e) certain of said toggle links having an end fixedly connected to and rotatable with said tubular members and pivotally connected adjacent their opposite ends to another set of toggle links,
  (f) said another set of toggle links having their free ends pivotally connected to said panel whereby rotatable movement of said tubular members about their long axes will pivot said certain of said toggle links and said another set of toggle links relative to each other and said panel to move the same horizontally with respect to the side walls,
  (g) latch bars carried by said opposite ends of said certain of said toggle links and movable relative one to the other through a horizontal plane by corresponding movement of said certain of said toggle links, and
  (h) manually controlled latching means locking together said latch bars at any point throughout their longitudinal length for preventing any movement of said plurality of toggle links and said freight engaging panel relative to said tubular members and the side walls of the chamber.

3. An adjustable load spacer as defined in claim 2 including a hollow bracket carried by the rear surface of said panel intermediate its side edges for receiving and guiding said latch bars as they extend in a superimposed horizontal plane with respect to each other and cooperating therewith to releasably latch said panel and said toggle links against any movement relative to each other and to the side walls of the chamber.

4. An adjustable load spacer as defined in claim 3 including said latching means comprising a slidable latch bolt having a free end engaging and locking together said latch bars at any selected point throughout their longitudinal length for preventing any movement of said toggle links and said panel relative to each other and to the side walls of the chambers.

5. An adjustable load spacer as defined in claim 4, wherein each of said latch bars having formed therein throughout their length a series of apertures and said guiding means provided with a like aperture with said apertures receiving the free end of said latch bolt to selectively and releasably lock said panel and said toggle links together against any movement relative to each other and to the side walls of the chamber.

References Cited by the Examiner
UNITED STATES PATENTS

| | | | |
|---|---|---|---|
| 1,833,016 | 11/31 | Chandler | 105—369 |
| 1,846,757 | 2/32 | Rodgers | 105—369 |
| 1,909,178 | 5/33 | Hudson | 105—369 |
| 2,160,870 | 6/39 | Jones | 105—376 |
| 2,482,367 | 9/49 | Ravers | 105—369 |
| 2,516,527 | 7/50 | Oltz | 105—376 |
| 2,529,588 | 11/50 | Beckett | 105—369 |
| 2,819,810 | 1/58 | De Witt | 105—369 |
| 2,885,221 | 5/59 | Weeks | 105—376 X |
| 3,018,741 | 1/62 | Loomis et al. | 105—376 |

MILTON BUCHLER, *Primary Examiner.*

LEO QUACKENBUSH, *Examiner.*